(12) United States Patent
Chio

(10) Patent No.: US 8,177,482 B2  
(45) Date of Patent: May 15, 2012

(54) WIND POWER CONVERSION APPARATUS DRIVEN BY FLY WHEEL

(76) Inventor: Chuy-Nan Chio, Taipei (TW)

( * ) Notice: Subject to any disclaimer, the term of this patent is extended or adjusted under 35 U.S.C. 154(b) by 1254 days.

(21) Appl. No.: 11/910,918

(22) PCT Filed: Apr. 8, 2005

(86) PCT No.: PCT/CN2005/000466
§ 371 (c)(1), (2), (4) Date: Oct. 8, 2007

(87) PCT Pub. No.: WO2006/105690
PCT Pub. Date: Oct. 12, 2006

(65) Prior Publication Data
US 2008/0166228 A1 Jul. 10, 2008

(51) Int. Cl.
*F03D 3/04* (2006.01)
(52) U.S. Cl. ............ 415/4.2; 415/4.4; 415/907; 416/144
(58) Field of Classification Search ............... 415/4.1, 415/4.2, 4.4, 200, 207, 907; 416/144, 145, 416/146 R, 197 A, 234, 241 R, DIG. 4
See application file for complete search history.

(56) References Cited

U.S. PATENT DOCUMENTS

| 2,240,290 | A | * | 4/1941 | Du Brie | 415/4.2 |
| 4,047,833 | A | * | 9/1977 | Decker | 415/4.4 |
| 4,179,007 | A | * | 12/1979 | Howe | 180/2.2 |
| 5,083,899 | A | * | 1/1992 | Koch | 415/2.1 |
| 6,655,907 | B2 | * | 12/2003 | Brock et al. | 415/4.2 |
| 2006/0108809 | A1 | * | 5/2006 | Scalzi | 290/55 |

* cited by examiner

*Primary Examiner* — Edward Look
*Assistant Examiner* — Jesse Prager
(74) *Attorney, Agent, or Firm* — Chun-Ming Shih

(57) ABSTRACT

A wind power conversion apparatus driven by a fly wheel includes a wind channel, a fly wheel and a rotating shaft. The wind channel is configured into a long hollow tapered tubular shape with both ends open. One end, which being larger is cross section, serves as a wind inlet, while to other smaller one serves as a wind outlet so as to conduct the wind flow into the apparatus via the wind channel. A fly wheel with several wind vanes is installed in the wind channel proximate to the wind outlet so as to convert the wind force into an adjustable rotating torque of the fly wheel. The fly wheel is able to keep rotating about the rotating shaft by its inertia for a certain duration of time even after the wind ceases to blow. With this apparatus, the kinetic energy of the wind blow is converted into an adjustable and storable mechanical energy to utilize.

6 Claims, 3 Drawing Sheets

WIND POWER CONVERSION APPARATUS DRIVEN BY FLY WHEEL

BACKGROUND OF THE INVENTION

1. Field of the Invention

The present invention relates to a fly wheel drive wind power utilization apparatus with a wind channel, and more particularly, to a wind power utilization apparatus which comprises a wind channel to focus the coming wind flow for driving a fly wheel and again converting the fly wheel rotating power into an output of the mechanical power.

2. Description of the Prior Art

Utilization of wind power has already lasted thousands of years experience in the world history. Traditionally, the wind power utilization apparatus composed of a rotating shaft wind mill with several wind vanes and fly ball or wheel to drive the rotating shaft of a generator. The wind vanes and fly ball or wheel rotate by actuation of wind force according to the pneumatic operational principle whereas the wind force can be divided into the effective and the resistant components. The effective force exerts on the wind vanes and the fly wheel or ball to produce a rotating torque causing them to rotate thereby converting the kinetic energy of the wind flow into a mechanical or an electrical energy. Meanwhile, the conventional wind power utilization apparatus acting as such has the following demerits:

1. The energy conversion efficiency of the wind vanes and the fly wheel or ball is as low as 20~30%, it further goes down to 70% of its original value under the actual randam wind flow direction. After subsequent mechanical to electrical energy conversion, almost nothing is remained as a useful output.

2. It is impossible to expect an ideal state of constant and stable wind flow in the natural world. The output of the wind power utilization apparatus will never be able to maintain stable when the rotational torque of its wind vanes varies abruptly in accordance with the steep change of the wind force.

3. For effectively focusing the wind force, the wind power utilization apparatus has to be equipped in somewhat serried ambience which causes turbulent flow of wind between the front and rear of the wind vanes thereby augmenting the wind resistance.

For these defects noticeable on the prior art, it is therefore necessary for us to continue meeting the challenge for an improvement.

SUMMARY OF THE INVENTION

The main object of the present invention is to provide a fly wheel drive wind power utilization apparatus in which a high energy conversion technique is employed to convert the wind energy into a mechanical energy.

Another object of the present invention is to provide a wind power utilization apparatus equipped with a fly wheel and a wind channel to stably operate and be able to easily assemble.

The wind power utilization apparatus achievable of above mentioned objects comprises a wind channel, a fly wheel and a rotating shaft. The wind channel is configured into a long hollow tapered tubular shape with both ends open. One end, which being larger in cross section, serves as a wind inlet, while the other smaller one serves as a wind outlet so as to conduct the wind flow into the apparatus via the wind channel. A fly wheel with several wind vanes is installed in the wind channel proximate to the wind outlet so as to convert the wind force into an adjustable rotating torque of the fly wheel. The fly wheel is able to keep rotating about the rotating shaft by its inertia for a certain duration of time even after the wind ceases to blow. With this apparatus, the kinetic energy of the wind flow is converted into an adjustable and storable mechanical energy to utilize.

The fly wheel drive wind power utilization apparatus of the present invention non-uniformly disposes several heavy, round weights annularly around the fly wheel in the way quite different from the conventional fly wheel arrangement in which the mass of the fly wheel is uniformly distributed overall. As the aspect of overall mass distribution is different in above two cases, the resultant rotational inertia will be different in two cases too. In the case of the present invention, the apparatus is able to maintain the stable operation even if a steep change occurs to the wind force.

In the present invention, several streamlined, low wind resistance, circular fly wheel shuttle blocks are annularly disposed around the edge of the fly wheel base plate with a weighing substance contained in each shuttle block to increase the rotating inertia. In the case a steep change occurs to the wind force, the rotation torque supplied to the fly wheel from the wind vanes affected by the varying wind force varies accordingly. At this moment the distributed weights of the shuttle blocks around the fly wheel exhibit a larger rotational inertia to alleviate such a steep change of the wind force thereby keeping the wind power utilization apparatus to operate stably without hunting.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
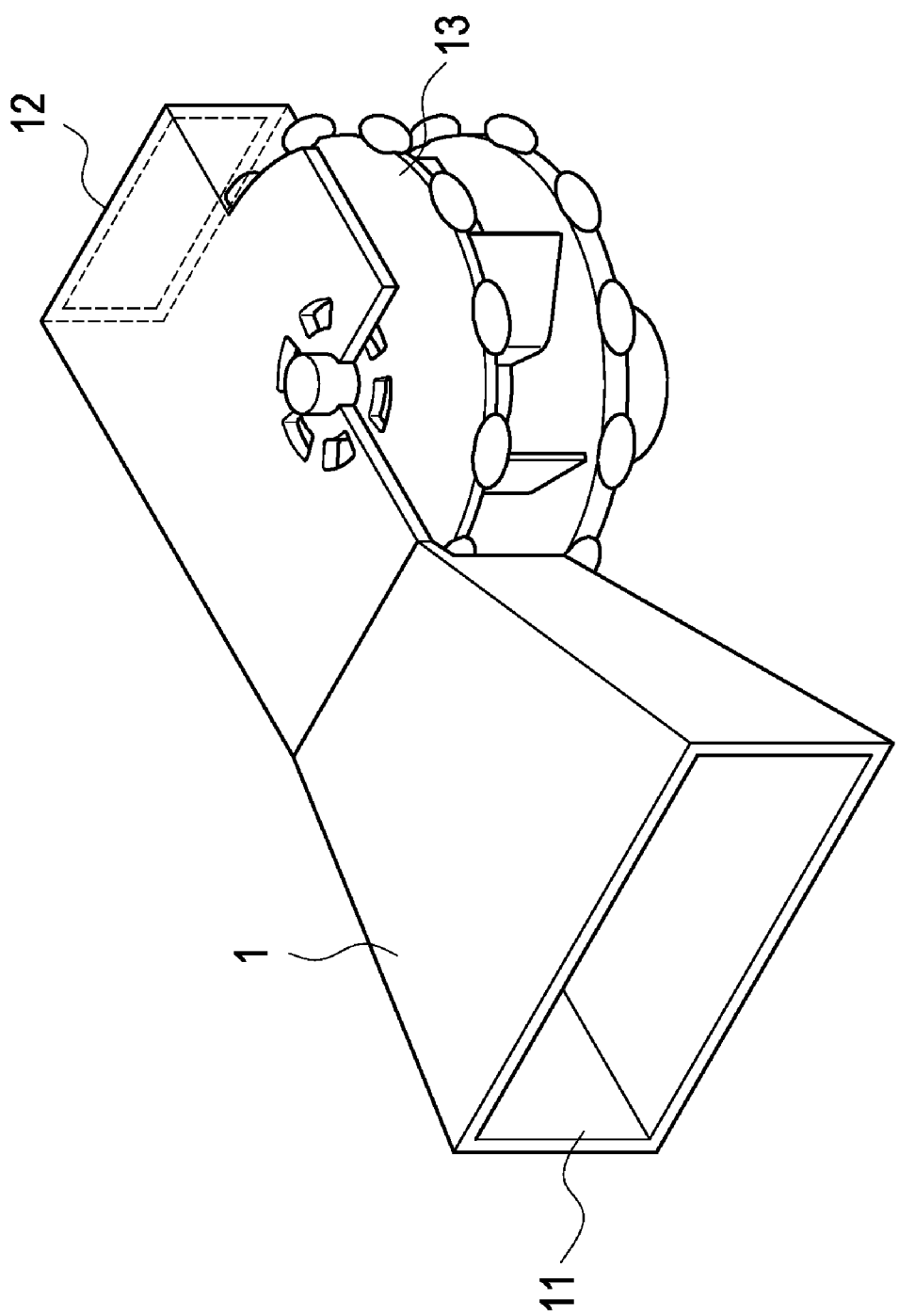
FIG. 1 is a perspective view of the present invention.

Referring to FIG. 1, it can be seen on this perspective view that a wind channel 1 is configured into a long hollow tapered tubular shape with both ends open. One end, which being larger in cross section, serves as a wind inlet 11, while the other smaller one serves as a wind outlet 12 so as to conduct the wind flow into the apparatus via the wind channel 1. The wind flow, which been conducted into the wind channel 1 from the wind inlet 11 flows to the wind outlet 12 of smaller cross section and gradually intensify its wind strength by focusing the wind flow. A fly wheel 2 is installed in the wind channel 1 proximate to the wind outlet 12.

Figure 2:
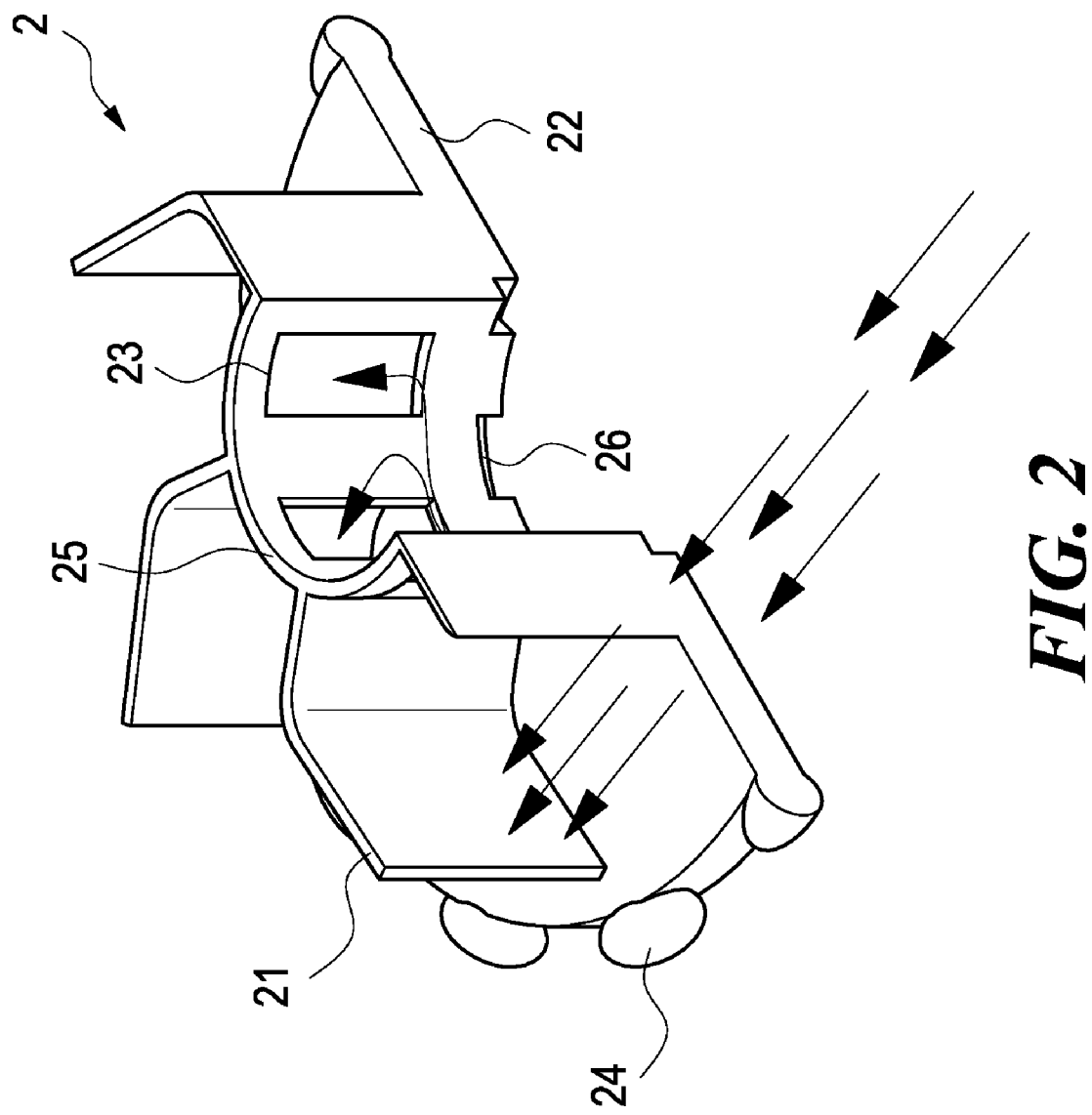
FIG. 2 is a cross sectional view of the fly wheel according to the present invention.

Next, referring to FIG. 2, the fly wheel 2 comprises a circular base plate 22 with several shuttle shaped blocks 24 disposed round the outer edge of the fly wheel 2 in equal spacing, while around the inner edge of the base plate 22 there vertically erects a continuous wall 25 with a serrated notch 26 formed on the bottom edge of the continuous wall 25. Several wind vanes 21 shaped in "<" when viewed from the top are provided between the base plate 22 and the continuous wall 25 in the form mutually symmetrical with respect to the axis of the fly wheel 2. Several air windows 23 are opened on the continuous wall 25 between the wind vanes 21. When the wind flow is conducted to the fly wheel 2 via the wind channel 1, it impacts the wind vanes 21 and imparts parts of the wind energy to the fly wheel 2 for rotating it. After having been lost parts of the energy, the wind flow may slow down its own speed and be pushed by the subsequent wind flow of larger speed so as to form a turbulent flow therebetween that results in increase of resistant force to lower the operation efficiency of the apparatus, or even cause it unable to work normally. The aforesaid air windows 23 serve to conduct such an ineffective air flow to the opposite side so as to maintain normal operation of the fly wheel 2, and at the same time, forming a whirling air stream within the space seized by the continuous wall 25 that aids reducing the wind resistance against fly wheel 2, or the surface of the wind vanes 21 may be granulated by coating to enhance glutinous force to the air molecules.

The fly wheel 2 rotates together with its top cover 13 with all weight uniformly distributed along the edges of both top cover 13 and the fly wheel 2. In the present embodiment, the weights are those streamlined shuttle blocks 24 containing a heavy substance inside that serve to improve the rotational inertia. Alternatively, the base plate 22 may be constructed in such way that it is thinner in inner portion and thicker in outer portion, or attach weights to the edge of the base plate 22, all the above contrivances work well to increase the rotational inertia of the fly wheel 2. When the rotational torque of the wind vanes 21 changes abruptly in accordance with the steep variation of the wind force, the fly wheel 2 is capable of alleviating such a steep change of the wind force with its large rotational inertia. In other words, the fly wheel 2 is able to keep rotating by its inertia for a certain duration of time even after the wind ceases to blow. That is to say, the fly wheel 2 will never suddenly accelerate/decelerates its rotational speed even though under abrupt change of wind strength.

Figure 3:
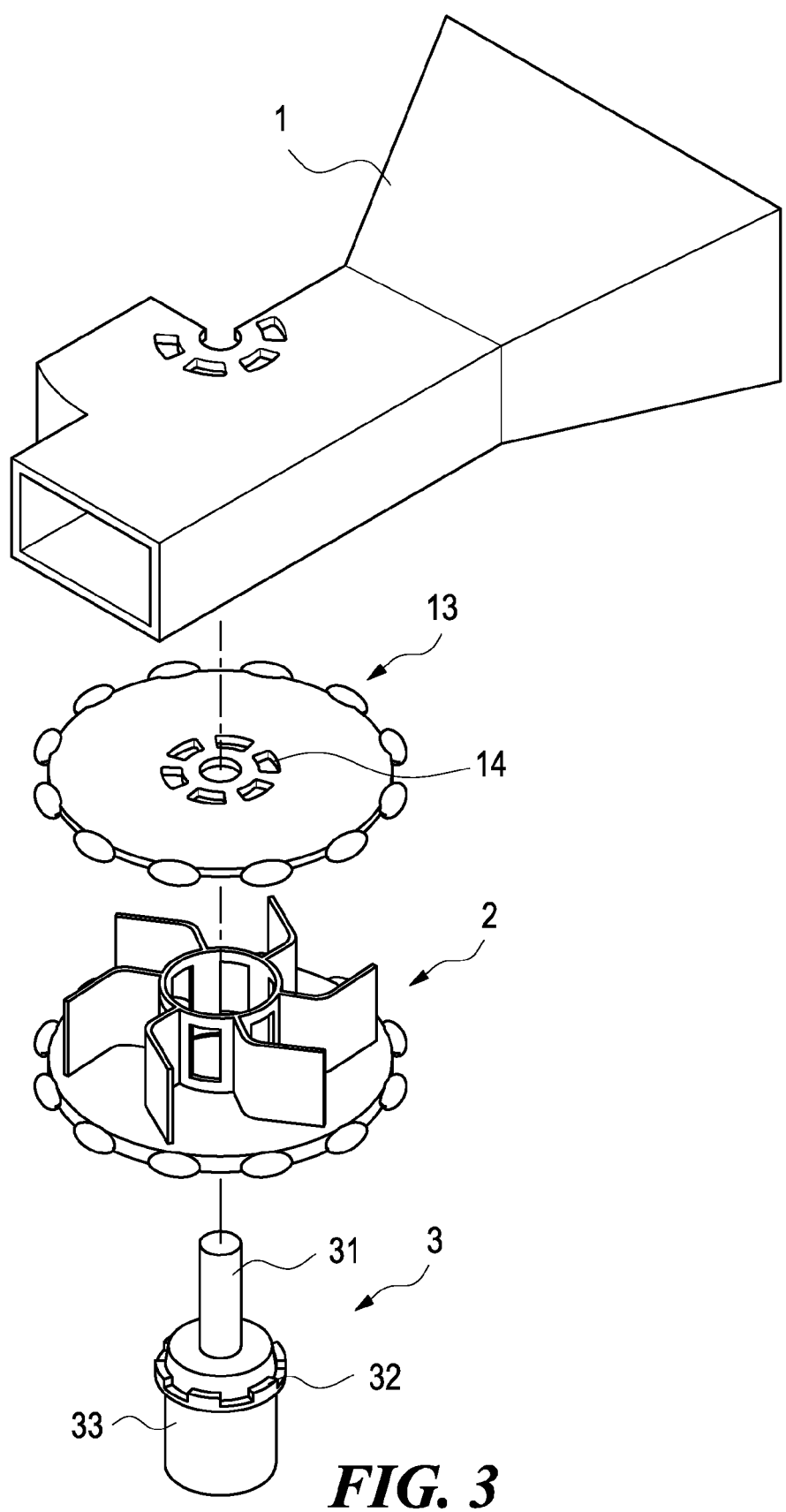
FIG. 3 is an exploded view of the present invention.

Referring to FIG. 3, in this exploded view of the present invention, a cylindrical rotating shaft 3 erected vertically to the ground is formed of an inner shaft cove 31 with smaller diameter and an output shaft 33 with larger diameter sleeved coaxially over the former. At the junction of the two shafts there is provided with a downward hook 32 which is used to engage with the corresponding serrated notch 26 provided to the fly wheel 2. After the rotating shaft 3 is engaged with the fly wheel 2, the shaft core 31 supports the top cover 13 at its center thereby rotating shaft 3, fly wheel 2 and the top cover 13 are able to rotate as a whole in the same direction. The other end of the output shaft 33 may be connected to the mechanical shaft of certain energy storage device or a generator so as to convert the rotational kinetic energy produced by the apparatus of the present invention into another form of energy. Several wind escape holes 14 are opened annularly about the center of the top cover 13 so as to expel useless wind flow. After assembling the above mentioned component parts, the wind power utilization apparatus of the present invention will be built up as shown in FIG. 1.

If the wind power utilization apparatus of the present invention is applied to aircrafts, automobiles, railroad trains that move with a high speed, or any transportation facilities work at high wind pressure, it will definitely well make use of the wind power effectively without too much wind loss.

In brief, it emerges from the description of the above example that the invention has several noteworthy advantages, in particular:

1. Several air windows are formed between the wind vanes that is effective to prevent the occurrence of turbulent flow and minimize resistance to the fly wheel rotation.

2. The essential weights are annularly disposed along the edge of the fly wheel to improve the distribution of the rotating inertia that is quite different from the conventional design to make the mass of the fly wheel uniformly distributed overall that results in a poor rotating inertia insufficient to avoid hunting phenomenon under the sudden change of the wind force.

3. The apparatus of the present invention is easy for industrial production, and the product is widely applicable to aircrafts, automobile and trains.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A wind power conversion apparatus driven by fly wheel comprising:
    a wind channel configured into a long hollow tapered tubular shape with both ends open, one end which being larger in cross section for serving as a wind inlet, while the other smaller one for serving as a wind outlet;
    a fly wheel installed in said wind channel proximate to said wind outlet and having a circular base plate and several wind vanes provided symmetrically around the center of said base plate, wherein the essential weight of said fly wheel is uniformly distributed around the outer edge of said base plate; and
    a rotating shaft configured into a cylindrical column in connection with said fly wheel to output its rotational power,
    wherein a serrated notch is formed at the bottom edge of a continuous wall erected on said fly wheel, while a downward hook is provided at the edge of said rotating shaft at the position corresponding to said serrated notch so as to engage with each other.

2. The apparatus of claim 1, wherein several air windows are formed among said wind vanes of said fly wheel.

3. The apparatus of claim 1, wherein said rotating shaft and said fly wheel rotate in the same direction.

4. The apparatus of claim 1, wherein said rotating shaft is able to be in connection with a mechanical shaft of any energy storage device to output its rotational power.

5. The apparatus of claim 1, wherein said base plate of said fly wheel is attached with weights.

6. The apparatus of claim 1, wherein the surface of said wind vanes is granulated by coating.

* * * * *